UNITED STATES PATENT OFFICE.

GEORGE W. PATNOE, OF MAPLE GROVE, OHIO, ASSIGNOR, BY MESNE ASSIGNMENTS, TO THE DOLOMITE PRODUCTS COMPANY, OF CLEVELAND, OHIO, A CORPORATION OF OHIO.

FURNACE-LINING AND METHOD OF MAKING SAME.

1,230,430.           Specification of Letters Patent.      Patented June 19, 1917.

No Drawing.       Application filed November 16, 1915. Serial No. 61,821.

*To all whom it may concern:*

Be it known that I, GEORGE W. PATNOE, a citizen of the United States, and a resident of Maple Grove, county of Seneca, and State of Ohio, have invented a new and useful Improvement in Furnace-Linings and Methods of Making Same, of which the following is a specification, the principle of the invention being herein explained and the best mode in which I have contemplated applying that principle, so as to distinguish it from other inventions.

The object of the present invention is the production of an improved lining for furnaces for steel manufacture and other analogous uses out of materials which are more or less readily available, but which, so far as I am aware, have never heretofore been utilized in the manner and for the purpose set forth. The use of hard burned magnesian lime, generally mixed with tarry matter, as a lining material for steel furnaces, especially in the basic open-hearth and basic Bessemer processes, is well known; however, most of the magnesian lime found in the market is objectionable because of its lack of density, and its tendency to slake on exposure to air. And while this objection has been to some extent overcome by burning impure stone, containing a considerable percentage of silicious impurities, the product is variable in composition and usually contains so high a proportion of silicious matter as to be of inferior heat resisting properties and inefficient for the service required, namely the removal of silicon and phosphorus from the metal treated.

The present improved furnace lining, when made in the manner presently to be set forth, possesses in the highest possible degree the qualities required for the use in question, namely, purity, refractoriness and freedom from tendency to slake upon exposure to air and moisture.

In carrying out the present invention, I preferably take a relatively pure magnesian limestone, or dolomite, and render it dense and stable by incorporating therewith an extremely small percentage of fluxing material. The latter may be of argillaceous composition, consisting of silica, alumina and iron oxid, or of one or two of these constituents. In order that a sintering effect may be produced by the action of a very small proportion of flux, it is important that the raw magnesian lime and argillaceous material shall be intimately mixed and finely ground together, and that the mixture shall be calcined at nearly white heat (2600° to 3000° F.) until the product becomes thoroughly shrunken and dense. When so treated a mixture containing before calcination as little as 3 to 4 per cent. of argillaceous flux will be found to give a product of good density, which will resist for some weeks the action of air and moisture. It is evident that this stability is chiefly due to the density of the material, since the proportion of argillaceous substance present is insufficient to fix or combine with more than a very small part of the lime contained in the product.

As a practical example of the working of the process, I may take ordinary magnesian limestone, or dolomite as aforesaid, and, after determining by analysis the amount of fluxing agents, as silica, alumina and iron oxid, which it contains, I add such an amount of argillaceous matter, as clay, fireclay or shale, as is needed to bring the percentage of the above fluxing ingredients in the mixture to a total of from 3 to 5 per cent., according to the degree of stability required. The mixture is then ground, preferably with the addition of water, to such fineness that practically all of it will pass a sieve of 100 meshes to the linear inch. The ground mixture is then calcined, preferably in a rotary kiln, at a temperature at the hottest zone of 2600 degrees to 3000 degrees F. The heat and speed of revolution of the kiln are so adjusted that the charge is kept at high temperature long enough for it to become thoroughly sintered and shrunk to dense, solid masses. These issue from the kiln in small, rounded fragments, more or less dark in color according to the amount of iron oxid present. The material is then ready for use, by well-known means, in lining furnaces for steel melting, or for other similar purposes, or it may be crushed for such use to any desired size.

The following analyses will serve to additionally illustrate the character of the raw mixture and calcined product which has been found sufficiently stable and satisfactory for the purpose in view:

|  | Before calcination. | After calcination. |
|---|---|---|
| Loss on ignition | 39.76 | |
| Silica | 2.29 | 3.80 |
| Alumina | 1.01 | 1.68 |
| Iron oxid | 0.53 | 0.88 |
| Lime | 31.84 | 52.85 |
| Magnesia | 24.57 | 40.79 |
|  | 100.00 | 100.00 |

While in the specimen material thus analyzed, approximately 3¾ per cent. of the so-called argillaceous material is used in the raw or pre-calcined mixture, making approximately 6½ per cent. in the finished product. I have found that a still lower percentage of fluxing constituents than above indicated may be used with good result, provided the calcined material is stored in a fairly dry place and used within a reasonably short time; for example, a total of silica, alumina and iron oxid of two per cent. in the raw mixture and 3⅓ per cent. in the calcined product. It is also to be understood that while magnesian lime is preferable, as requiring a very low proportion of fluxing material to give a dense product, limes low in magnesia may also be used, provided the proportion of flux be increased substantially in proportion to the percentage of lime contained.

Other forms may be employed embodying the features of my invention instead of the one here explained, change being made in the form or construction, provided the elements stated by any of the following claims or the equivalent of such stated elements be employed, whether produced by my preferred method or by others embodying steps equivalent to those stated in the following claims.

I therefore particularly point out and distinctly claim as my invention:—

1. A refractory material for furnace-linings and the like consisting of the granular product resulting from the calcination of a mixture of finely divided magnesium limestone and a small percentage of argillaceous matter, substantially as described.

2. A refractory material for furnace-linings and the like, consisting of the granular product resulting from the calcination of a mixture of finely divided magnesian limestone and a small percentage of argillaceous matter containing iron oxid, substantially as described.

3. A refractory material for furnace-linings and the like consisting of the granular product resulting from the calcination of a mixture of finely divided magnesian limestone and from two to five per cent. of its weight of argillaceous matter, substantially as described.

4. A refractory material for furnace-linings and the like, consisting of the granular product resulting from the calcination of a mixture of finely divided magnesian limestone and from two to five per cent. of its weight of argillaceous matter containing iron oxid, substantially as described.

5. A refractory material for furnace-lining and the like consisting of the sintered product resulting from the calcination of magnesian limestone and two to five per cent. of its weight of silica, alumina and iron oxid intermixed therewith.

6. A refractory material for furnace-linings and the like consisting of an intimate and calcined mixture of magnesian lime with approximately three and one-third to six and one-half per cent. of its weight of silica, alumina, and iron oxid.

7. The method of making a refractory material for furnace-linings and the like, which consists in adding to magnesian limestone a small percentage of argillaceous matter, both in finely ground condition, and calcining the mixture while in such condition at high heat, whereby a sintered granular product results.

8. The method of making a refractory material for furnace-linings and the like, which consists in adding to magnesian limestone a small percentage of argillaceous matter containing iron oxid, both in finely ground condition, and calcining the mixture while in such condition at high heat, whereby a sintered granular product results.

9. The method of making a refractory material for furnace-linings and the like, which consists in adding to magnesian limestone from two to five per cent. of argillaceous matter in the form of silica, alumina and iron oxid, all in finely ground condition, and calcining the mixture at high heat.

10. The method of making a refractory material for furnace-linings and the like, which consists in adding to magnesian limestone from two to five per cent. of argillaceous matter in the form of silica, alumina and iron oxid, grinding the mixture until it is substantially all in finely ground and thoroughly inter-mixed condition, and thereupon calcining such mixture at high heat.

11. The method of making a refractory material for furnace-linings and the like, which consists in adding to magnesian limestone from two to five per cent. of argillaceous matter in the form of silica, alumina and iron oxid, grinding the mixture until it substantially all passes a 100-mesh sieve, and thereupon calcining such mixture at a temperature of 2600 degrees to 3000 degrees F. until it is reduced to a dense sintered mass resistant to air and moisture, substantially as described.

Signed by me, this 15th day of November, 1915.

GEORGE W. PATNOE.

Attested by:—
　Frank T. Dore,
　Marian Thomas.